DEVICES EMPLOYING THIN MAGNETIC FILMS

Filed March 10, 1965

INVENTOR
ANDREW CHARLES TICKLE
BY Kane and Nydick
ATTORNEYS

United States Patent Office 3,447,139
Patented May 27, 1969

3,447,139
DEVICES EMPLOYING THIN MAGNETIC FILMS

Andrew Charles Tickle, Saskatoon, Saskatchewan, Canada, assignor to International Computers and Tabulators Limited Filed Mar. 10, 1965, Ser. No. 438,687
Claims priority, application Great Britain, Mar. 10, 1964, 10,130/64
Int. Cl. G11b 5/74, 5/00
U.S. Cl. 340—174 9 Claims

ABSTRACT OF THE DISCLOSURE

An improved shift register is described, of the kind in which a length of thin anisotropic magnetic film strip is arranged with its easy axis of magnetization aligned with the longitudinal axis of the strip, the film strip being initially all in one remanent stable state with is magnetization vector aligned in one direction along the easy axis, and in which an item of information is represented in the register by an area of reversed magnetic state in the film. This area of reversal is constrained to move along the film strip by the cooperation of a magnetic biassing field applied to the whole strip, which is of sufficient magnitude to induce motion outwards of the walls bounding the reversed area, with the cyclic sequential energization of control conductors spaced along the strip, each of which conductors produces a saturating magnetic field acting on the strip and capable of resetting any reversal of state. The cyclic energization of the conductors both limits the extent of wall movement at one edge of the area in the required direction of motion and forces the opposite edge of the area to follow. At the same time the magnitude of the control fields is sufficient to prevent the formation of reversed nuclei behind the moving area.

This invention relates to devices employing thin magnetic films, and particularly to information shifting registers.

Previously proposed information shifting registers have employed one or more strips of anisotropic magnetic thin film having two stable states in which the magnetisation vector lies in opposite directions, respectively, along an easy axis extending longitudinally along the strip. The film strip is initially all in one stable state, and an item of information is entered into the register by reversing the state of a small area of the strip, so that the magnetisation vector of this small area is aligned in the opposite direction to that of the remainder of the film. The reversed area acts as a single domain, and the area of reversal is shifted along the film strip by causing the leading and trailing edges of the area to move as a result of domain wall motion. Such wall motion is caused by magnetic fields generated by the passage of electrical currents through a series of shift conductors lying across the strip.

The prior devices have required the shift conductors to carry shift currents effective to produce fields acting in one sense upon the leading edge of the moving domain and in the opposite sense upon the trailing edge. It has been found that one of the principal difficulties encountered in operating shifting registers of this kind is to ensure complete erasure, or restoration to its initial state of the film area behind the shifted domain. Unless erasure is complete, there is a danger that remanent nuclei may remain in the unrestored state and these nuclei can grow during subsequent cycles, with the result that spurious reversal areas are created in the film strip. Since the shift conductors are normally used in the generation of both leading-edge and trailing-edge fields, it is difficult to increase the trailing-edge field alone, except by the use of fairly complex shift-pulse generators. Moreover, since the same conductors are used for both purposes, the prior devices have all necessarily used pulse trains for generating both the leading-edge and trailing-edge fields.

It is an object of the present invention to provide an improved information shifting register using magnetic thin film, in which the fields for shifting the information and for restoring the film area are independently controlled.

According to the present invention, an information shifting register includes a length of continuous anisotropic magnetic thin film having a first stable state of magnetisation in which the magnetisation is aligned in one direction substantially along the length of the film, and a second stable state in which the magnetisation is aligned in the opposite direction, said film being initially wholly in said first stable state; switching means to switch a small area of the film to said second stable state to represent an entered information item, said area having leading and trailing edges with respect to the desired direction of shift of said item along the film; means to apply to said film a biassing magnetic field tending to extend the switched area along the film by domain wall motion of said leading edge; a plurality of parallel shift-control conductors positioned in succession along the length of the film, each conductor lying across the film; and means to energise the shift-control conductors cyclically, in order of their position along the film taken in the direction of said wall motion, to produce controlling magnetic fields linked with the film to control the motion of said leading edge and to restore the film behind said trailing edge to said first stable state.

One example of apparatus embodying the present invention will now be described with reference to the accompanying drawing, in which.

Figures 1, 2:
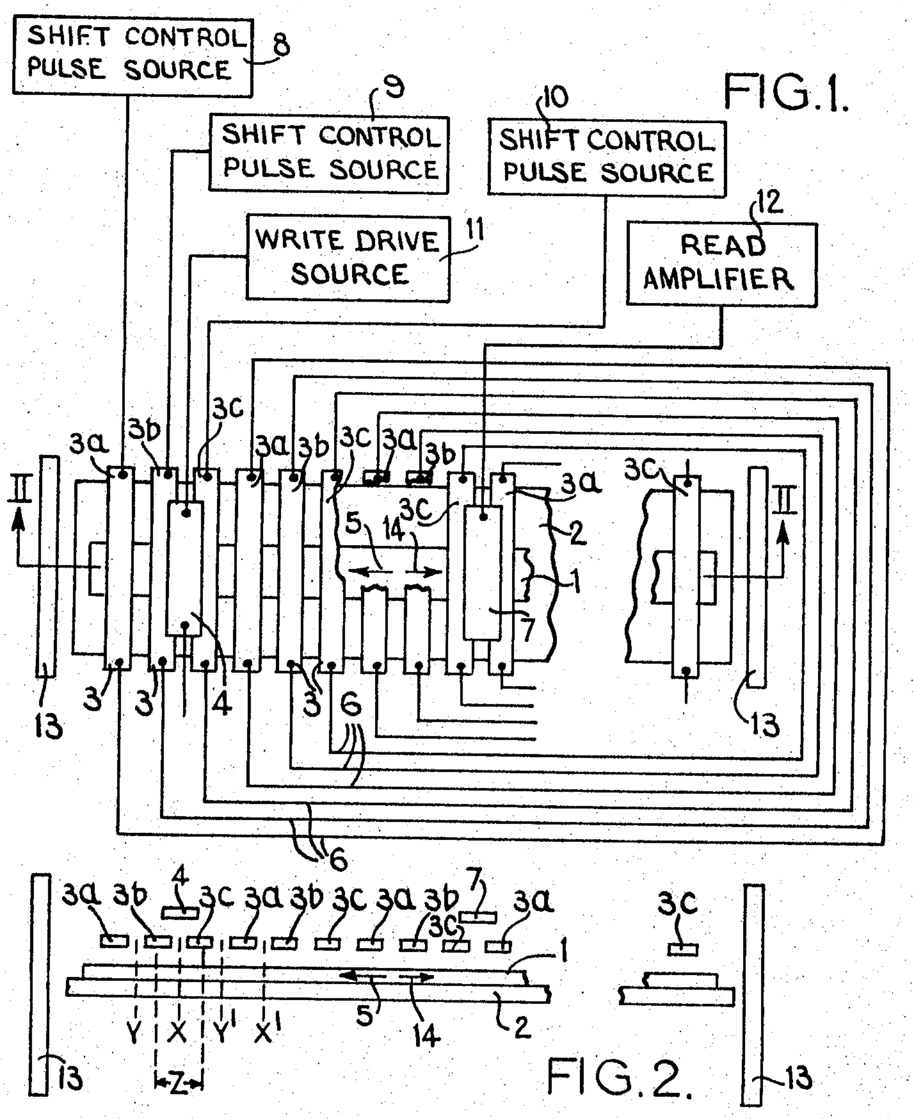
FIGURE 1 is a diagrammatic plan view of a thin film shifting register.
FIGURE 2 is a section on the line II—II of FIGURE 1.

It will be appreciated that the drawing is primarily intended to show the general arrangement and to facilitate an explanation of the operation of the register and is not indicative of the actual or relative dimensions of the parts shown.

Referring now to FIGURES 1 and 2 of the drawing, a continuous length of thin anisotropic magnetic film 1 is supported on a substrate 2. The film 1 is formed in the conventional manner by vacuum deposition on to the substrate 2 in the presence of an aligning magnetic field, the film 1 having an easy axis of magnetisation substantially aligned with the long axis of the substrate 2. A number of parallel shift-control conductors 3 are formed across the film 1. These conductors 3 are sufficiently close to the film 1 to be magnetically linked with it, but are insulated from each other and from the film 1. For the sake of clarity, the insulation is omitted from the drawing, but it will be realised that both the insulation and the conductors 3 are conveniently formed by a similar process of deposition by evaporation in a vacuum; the conductors, for example, being deposited through a suitably-apertured mask. In a similar manner a write conductor 4 and a read conductor 7 are formed across the strip. The conductors 4 and 7 are spaced apart along the length of the film 1 and are insulated from the conductors 3 and from the film 1. The conductors 4 and 7 are sufficiently close to the film 1 to be magnetically linked with it.

It will be seen from FIGURE 1 that the conductors 3 are serially connected in groups by connections 6, the groups being indicated respectively by suffixes *a*, *b* and *c* to the reference 3. Thus, all the conductors 3*a* are connected in series to form one group. Similarly, the conductors 3*b* form a second group and the conductors 3*c* form a third group. Shift control pulse sources 8, 9 and 10 are connected, respectively, to the groups 3*a*, 3*b* and 3*c* of conductors, a write drive source 11 is connected to the write conductor 4, and a read amplifier 12 is connected to the read conductor 7. A pair of Helmholtz coils 13, positioned at the ends of the film 1, are energisable to apply a magnetic field along the easy axis of the film 1, in the direction of arrow 14.

For the purpose of describing the operation of the register, assume that the film 1 is initially in the state in which the magnetisation vector is aligned in the direction indicated by arrow 5.

The film 1 is subjected to a substantially constant biassing magnetic field produced by the coils 13, the magnitude of the biassing field being sufficient to produce motion of a domain wall if one is present in the film 1, but being insufficient alone to switch an area of the film 1 to produce a reversed domain. Since this biassing field is in the direction of the arrow 14, it opposes the initial magnetisation state of the film 1. Hence, since the film 1 is initially all in a single state, there is no domain wall present in the film and the biassing field has no effect on the film. The magnitude of the biassing field is as critical as the shifting fields of prior devices, which have been required to initiate wall motion without causing independent rotational switching. However, because the biassing field of the present device is substantially constant and is permanently applied, it has been found that its magnitude is more easily controllable than the magnitude of the pulsed fields produced by the driving currents of the prior devices.

Figure 3:
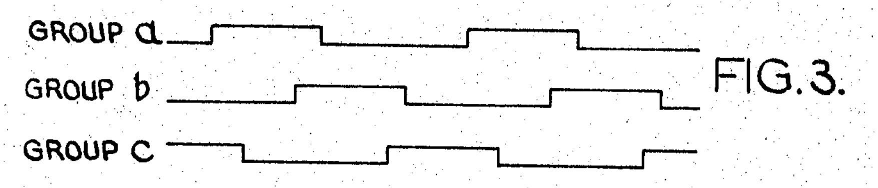
FIGURE 3 shows idealised shift-current waveforms.

The groups of conductors 3*a*, 3*b* and 3*c* are energised by the sources 8, 9 and 10, respectively, which apply shift-control current pulses in cyclic sequence as indicated in FIGURE 3 of the drawing. It will be seen that a pulse in any one conductor group 3*a*, 3*b* or 3*c* slightly overlaps the pulses in the adjacent groups. The shift-control current pulses are of a polarity such that they each produce a magnetic field acting in the direction indicated by the arrow 5, and the magnitude of the pulses is such that the field linking with the film 1 is at least sufficient to switch any film area with which the field is linked and which is in a reversed state, back to the initial state. Hence, it will be appreciated that the exact magnitude of each shift-control field is not critical, provided that it exceeds the minimum value necessary to produce rotational switching of the film area with which it is linked. In order to prevent the formation of remanent nuclei in the film 1, it is necessary that the conductors 3 are sufficiently closely spaced so that the shift-control fields acting on the film 1 produced by adjacent conductors overlap.

An information item is entered into the register by the energisation of the write conductor 4 by a short current pulse from the write drive source 11. The polarity and magnitude of this pulse are such that it produces a field acting on the film 1 which is sufficient to switch the area of the film 1 linked therewith from the initial state to the opposite state. Hence an information item entered into the register is represented by a small area of reversed magnetic state. If the conductors 3 are not energized at the time of entry, the domain walls bounding the reversal area will move under the influence of the biassing field until the entire film 1 is switched to the reversed state. However, this wall motion is restrained by the action of the shift-control fields produced by energisation of the conductors 3.

Let it be assumed that, at the time of entry of an information item, the conductors 3*a* are energised. Referring to FIGURES 2 and 3, it will be seen that the area of reversal produced by energisation of the conductor 4 will occupy the position Z. The boundary walls of this area move under the influence of the biassing field until they are restrained by the effect of the field produced by the conductors 3*a*. The area of reversal is now bounded by the dotted lines Y and Y'.

Just before the pulse on conductors 3*a* ceases, conductors 3*b* are energised, and the field produced by the left-most conductor 3*b* causes the trailing-edge boundary of the reversed area to move so that the reversed area is now bounded by dotted lines X and Y'. When the pulse on conductors 3*a* ceases, the leading boundary of the reversed area advances under the influence of the biassing field to the position indicated by the dotted line X', at which point it is again restrained by the field produced by the energising current of the next conductor 3*b*.

It will be seen that the initially entered reversal area has now effectively moved along the film by a distance corresponding to the width of one of the conductors 3, and it will be apparent that the energisation of the groups of conductors 3*a*, 3*b* and 3*c* in cyclic sequence allow this movement to continue. When the area of reversed magnetisation passes the read conductor 7, a pulse is generated in the conductor 7 and is passed to the read amplifier 12, thereby reading-out the stored information.

The mode of operation described allows separate control of the fields effectively acting to produce movement of the leading-edge and the trailing-edge of the reversed area. The leading-edge moves by wall movement brought about by the continuously-applied biassing field, and the action of the shift-control conductors 3 on this edge is to limit the forward movement. At the same time the sequential energisation of the shift-control conductors 3 causes the movement of the trailing edge. The fields produced by these conductors 3 are made sufficiently great to saturate the film 1 behind the reversal area as the area is shifted and so prevent the formation of remanent nuclei. Because the shift-control pulses are unidirectional and are uncritical in value, the apparatus for generating them may be correspondingly less complex than is the case where bipolar driving currents are required.

In the foregoing description the device has been described as a shift register, but it may, alternatively be used as a signal delay line, the delay being related to the distance separating the read conductor 7 and the write conductor 4, and the speed of propagation of the reversal area along the film 1. The speed is controlled by the rate at which pulses are applied to the shift-control conductors 3.

More than one read conductor 7 may be provided if required, and the shifted information item may be read out from each of the read conductors 7 in turn. In this form, the device may be used as a tapped delay line.

The device has been described as having a single film 1 associated with the groups of conductors 3*a*, 3*b* and 3*c*. It will be realised that, in practice, a number of shifting registers may be controlled by the conductors 3. For example, if a number of mutually parallel films 1 are crossed by the same conductors 3, a corresponding number of shifting registers will be driven in common.

Although the film 1, the conductors 3, 4 and 7, and the insulation are, as stated in the foregoing description, conveniently formed by vacuum deposition, any other suitable method of forming these components may be used. For example, the conductors may be formed from strips of metal foil.

Means other than the Helmholtz coils 13 shown in the drawing may be used for providing the biassing field. For example, these coils 13 may be replaced by a solenoid encircling the film 1 and having its axis along the easy axis of the film 1.

The conductors 3 have been described as being individually formed and connected into the requisite groups by connections 6. However, other methods of assembling the shift-control conductors may be employed. For example, a single group of shift-control conductors may be formed as a set of parallel striplines on a flexible support. This entire conductor assembly may then be wrapped about the substrate 2 carrying the film 1 so that each succeeding wrapping is laid alongside the preceding wrapping in order to produce a series of conductor groups lying across the film 1. In this way the conductors are linked with the film 1 in correct sequence. If the loops formed by the conductors and the flexible support are sufficiently large, only the parts of the conductors actually passing across one face of the film 1 will be magnetically linked with the film. On the other hand, the winding of the shift-control conductors in this way may, alternatively, be arranged so that the parts of a conductor on both sides of the film 1 are magnetically linked with the same part of the film. Under these conditions the magnetic coupling of these parts of the conductor is such that current flowing in the conductor creates aiding fields, so that the amplitude of the driving current may be reduced. The conductor spacing may then require to be modified slightly to ensure the overlapping of the magnetic fields acting on the film 1 as the result of energisation of adjacent conductors. In other words, the shift-control conductor spacing must be such that an area of the film 1 lying midway between two conductors can be fully switched by the combined effects of the fields produced by the concurrent energisation of the conductors.

What is claimed is:

1. An information shifting register including an elongate strip of anisotropic thin magnetic film having single domain characteristics and an easy axis of magnetization substantially parallel to the longitudinal axis of the strip, the entire film strip being initially in a first stable magnetic state in which the magnetization vector lies in a first direction along the easy axis; means for switching an area of the film strip to a reversed stable state in which the magnetization vector of the switched area lies in the opposite direction along the easy axis to represent an item of information; means for applying to the entire film strip a biassing magnetic field acting substantially parallel to said easy axis, the biassing field being of polarity and magnitude to produce wall movement of an area of reversed magnetic state tending to increase the size of such reversed area and being insufficient in magnitude otherwise to switch an unreversed area to said reversed state; a plurality of shift control conductors lying across the film strip substantially perpendicular to said easy axis, the conductors of said plurality being spaced along the length of the film strip, each conductor being magnetically linked with that area of the film strip across which it lies; and means for selectively energizing said shift control conductors in a succession of cycles to produce in each cycle a first magnetic field acting to limit movement of a first boundary wall of said reversed area in a predetermined direction along the film strip and a second magnetic field acting on the opposite boundary wall of said reversed area to cause said opposite boundary wall to move in said predetermined direction towards said first boundary wall, the selection of conductors being modified in successive cycles to produce movement of both boundary walls in said predetermined direction along the strip by a distance substantially equal to the spacing of adjacent conductors along the film strip for each cycle respectively, the magnitude of the second field being sufficient to prevent the isolation of remanent nuclei of reversal behind the reversed area as it is moved along the film strip.

2. A register as claimed in claim 1, in which the shift-control conductors are divided into interlaced groups, all the conductors of a group being energised simultaneously by the energising means.

3. A register as claimed in claim 2, in which said energising means applies to said conductors shift-control current pulses of such timing that a pulse applied to a conductor overlaps in time the pulses applied to both adjacent conductors.

4. A register as claimed in claim 3, in which said means for switching an area of the film to a reversed stable state includes a writing conductor lying across the film strip substantially perpendicular to said easy axis and means for energizing the conductor to produce a saturating magnetic field acting on that area of the film strip across which the writing conductor lies to switch that area by domain rotation to the reversed magnetic state.

5. A register as claimed in claim 4 having means for reading out an entered information item including a read conductor lying across the film strip substantially perpendicular to said easy axis and magnetically linked with that area of the film strip across which it lies, the read conductor being spaced away from said writing conductor in the predetermined direction of movement of the reversed area, an electrical signal being induced into said read conductor in response to the movement of said reversed area past said read conductor.

6. A register as claimed in claim 5, in which a plurality of said read conductors are magnetically coupled to said film strip, said read conductors being spaced apart in the predetermined direction of movement to produce a succession of output signals as said reversed area passes successive read conductors, the register thereby acting in effect, as a tapped delay device.

7. A register as claimed in claim 6, in which a plurality of mutually parallel film lengths are associated with the same shift-control conductors.

8. A register as claimed in claim 6, in which said means for applying a biassing magnetic field to the entire film strip includes a pair of Helmholtz coils, one coil being supported at each end of the film strip.

9. A register as claimed in claim 6, in which said means for applying a biassing magnetic field to the entire field strip includes a solenoid encircling said film strip.

References Cited

UNITED STATES PATENTS

| | | | |
|---|---|---|---|
| 2,919,432 | 12/1959 | Broadbent | 340—174 |
| 3,114,898 | 12/1963 | Fuller | 340—174 |
| 3,284,783 | 11/1966 | Davis | 340—174 |
| 3,241,127 | 3/1966 | Snyder | 340—174 |
| 3,366,936 | 1/1968 | Snyder | 340—174 |

FOREIGN PATENTS

| | | |
|---|---|---|
| 1,299,901 | 6/1962 | France. |

BERNARD KONICK, *Primary Examiner.*

G. M. HOFFMAN, *Assistant Examiner.*